United States Patent [19]
Perry, Jr.

[11] Patent Number: 6,079,427
[45] Date of Patent: Jun. 27, 2000

[54] GARBAGE AND REFUSE SCREENING SYSTEM FOR DISH MACHINES

[75] Inventor: Hubert A. Perry, Jr., Wellesley, Mass.

[73] Assignee: Adamation, Inc., Newton, Mass.

[21] Appl. No.: 09/144,203

[22] Filed: Sep. 1, 1998

[51] Int. Cl.$^7$ .................................................. B08B 3/02
[52] U.S. Cl. ...................... 134/104.4; 134/110; 134/111; 210/407; 210/413
[58] Field of Search .................................. 134/110, 111, 134/104.4; 210/407, 413

[56] References Cited

U.S. PATENT DOCUMENTS

| | | | |
|---|---|---|---|
| 532,600 | 1/1895 | Simon | 134/104.4 |
| 1,605,961 | 11/1926 | Loew | 134/104.4 |
| 1,866,519 | 7/1932 | Rataiczak | 134/111 |
| 2,949,120 | 8/1960 | Federighi | 134/111 |
| 3,273,573 | 9/1966 | Southard | 134/104.4 |
| 3,439,689 | 4/1969 | Zadron et al. | 134/104.4 |
| 3,506,022 | 4/1970 | Nlote | 134/104.4 |
| 3,823,823 | 7/1974 | Dokter et al. | 210/413 |
| 5,779,887 | 7/1998 | Rector et al. | 210/413 |

*Primary Examiner*—Frankie L. Stinson
*Attorney, Agent, or Firm*—Samuels, Gauthier & Stevens

[57] ABSTRACT

A commercial warewashing system has three sections, a pre-wash section, a power wash section and a final rinse section. The pre-wash section includes a sump. A perforated plate is placed in the pre-wash section over the sump. The plate receives and transfers water and gross garbage to a perforated trough secured to the side of the pre-wash section. Below the trough is a sink which communicates with the sump. The water flows into the sink and then into the sump. The gross garbage is retained in the trough. A spiral drive in the trough moves the gross garbage from the trough to a discharge end where it is removed.

4 Claims, 2 Drawing Sheets

GARBAGE AND REFUSE SCREENING SYSTEM FOR DISH MACHINES

BACKGROUND OF THE INVENTION

1. Field of the Invention

The invention relates to a device for the removal of gross garbage in the pre-wash zone of a warewasher.

2. Description of Related Art

In commercial warewashing systems, such as sold to hotels, resorts, universities and the like, there are typically several sections through which pass dishes, glasses, flatware, etc. to be cleaned. In one such system the dishes are held in racks, the racks are carried by dollies and the dollies travel on a conveyor pan. In another such system, the dishes are transported through the warewashing machine on a pronged belt conveyor (commonly referred to as a flight-type machine); and in still another such system, the dishes are loaded into a rack and the rack is then transported through the warewashing machine by various means such as chains, pawl bars, etc.

In many of these warewashing machines, there are usually three sequential sections, a pre-wash section, a power wash section and a final rinse section.

In the pre-wash section, the gross garbage from the dishes is removed. Subsequently the dishes enter the power wash section. The pre-wash, in essence, flushes the gross garbage from the dishes. Typically removable screens are placed in the bottom of the pre-wash section over a sump. Periodically, the screens are removed, cleaned and replaced. Alternatively, some systems place a slanted floor in the bottom of the pre-wash floor section. This slanted floor directs the water and the garbage to one side of the pre-wash section and funnels the water/garbage into an outlet several inches wide. The water/garbage from the outlet is dumped into an outside container, such as a hommel pot or into a box-like container, built onto the side of the system, having a screen basket that can be lifted out periodically and dumped.

Usually these containers are disposed such that the build-up of garbage on the screen is not seen unless a cover is removed. This results in occasional backup in the pre-wash and/or the power-wash zones resulting in down time loss to clean up.

The present invention embodies, a modular garbage and refuse system, which can replace the drawer-like screens currently used in the pre-wash section of many prior art warewasher systems.

A pre-wash section comprises a cabinet having a sump and a wall which wall is characterized by an opening. The system of the invention comprises a plate, a perforated trough having an open top to which the plate is secured and a sink underlies the perforated trough. A spiral drive is carried in the trough. The plate extends into the pre-wash zone. The trough is exterior of the wall. The sink is under the trough and is in fluid flow communication with the sump. The water and gross garbage flow across the plate and into the trough. The garbage is retained by the trough. The spiral drive transfers the garbage to the end of the trough where it is dumped into a receptacle. The pre-rinse water flows through the perforated trough into the sink and is returned to the sump of the pre-wash section.

The trough can have a series of different inclines and can be perforated entirely throughout or only a portion thereof. The water in the trough ensures the garbage does not cake while the water itself drains down through the perforations into the sink and returns to the sump in the bottom of the pre-wash section.

The trough is designed to operate in such a way as to take the mixture of garbage and pre-wash water out of the pre-wash section, straining the water out of the mixture and depositing the gross garbage into a container and returning the strained water to the pre-wash sump by gravity flow.

In a preferred embodiment, the plate is characterized by perforations to allow for some draining of the water through the plate into the sump. In a particularly preferred embodiment, the plate has at least one non perforated strip which functions as a sluice to allow water and gross garbage to flow directly to the trough. The strip is defined by adjacent perforated sections. Sometimes with heavy use, if there are perforations across the entire width of the plate the gross garbage will tend to mat on the plate and impede the flow to the trough. The non-perforated strip effects a sluicing action which not only allows for direct flow into the trough but also inhibits the mating of the gross garbage on the adjacent perforated sections.

DESCRIPTION OF THE PREFERRED EMBODIMENT(S)

Figure 1:
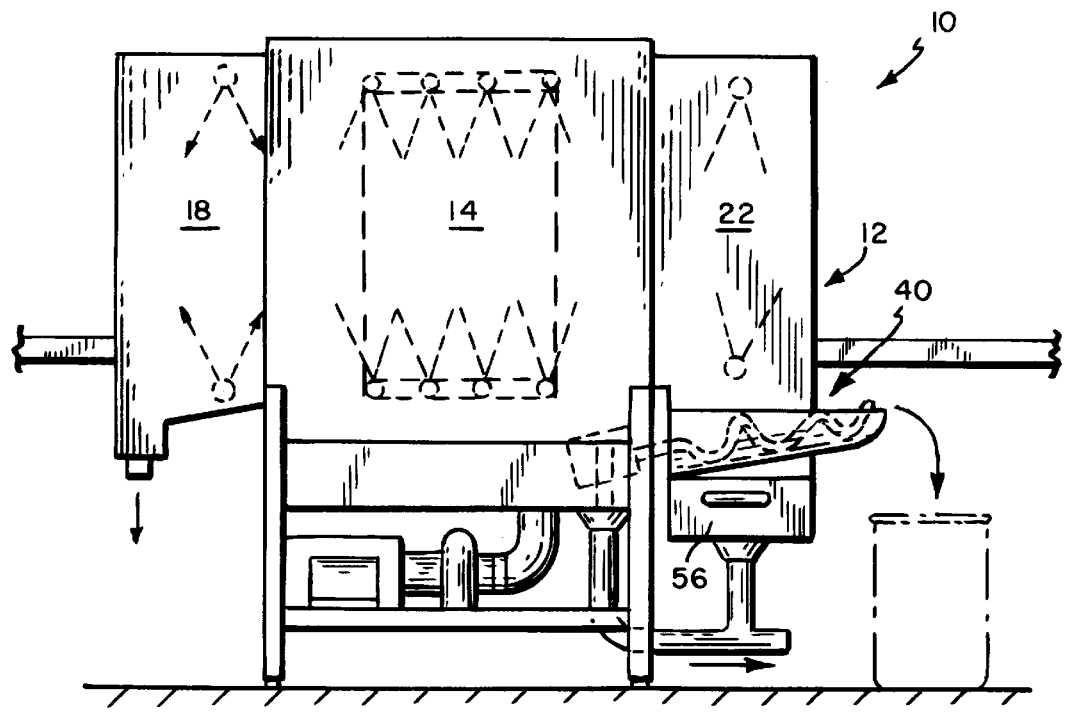
FIG. 1 is an illustration of a system of the invention in combination with a prior art pre-wash zone.

Referring to FIG. 1, the power wash cabinet 10 of a warewasher (not shown) comprises a pre-wash section 12, a power wash section 14 and a final rinse section 18.

Figure 2:
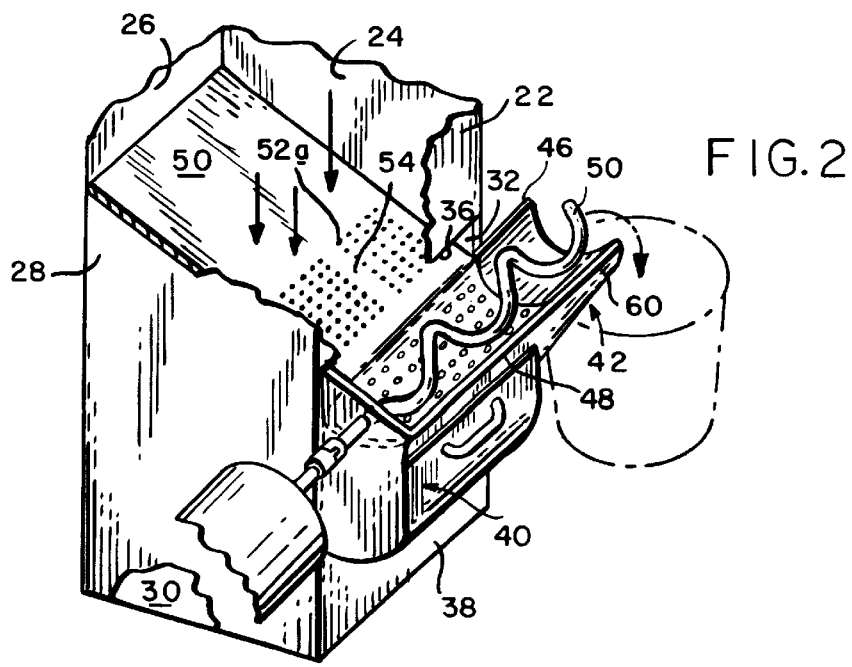
FIG. 2 is a top perspective view of the system.
Figure 3:
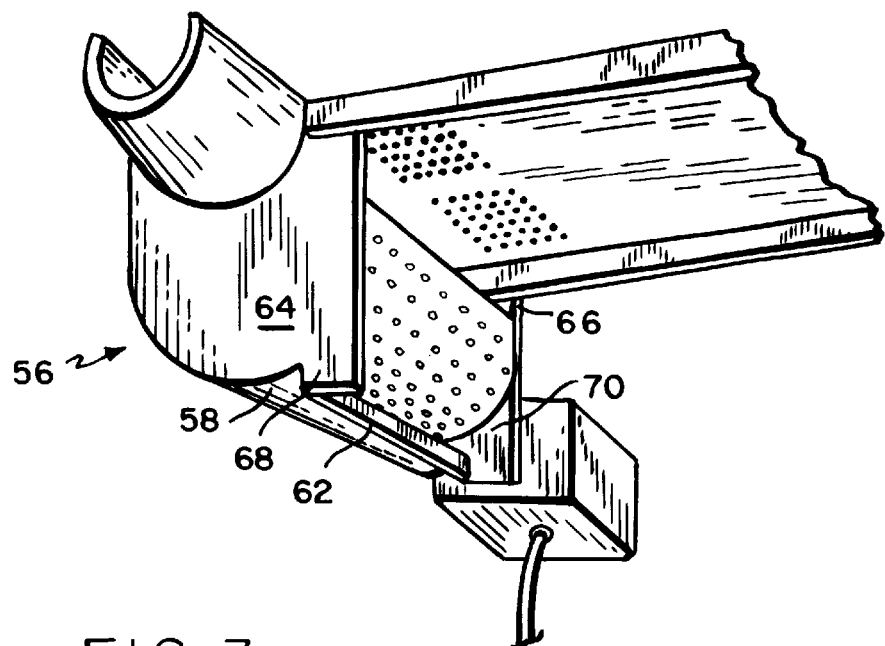
FIG. 3 is a side view of a system of the invention.

Referring to FIGS. 2 and 3, the pre-wash section 12 has walls 22, 24, 26 and 28, a bottom 30, an opening 32 and a support edge 34 (FIG. 3). The walls 22, 24, 26 and 28 and the bottom 30 form a sump 38.

A system 40 embodying the invention is shown and comprises a semi-circular trough 42 having perforations 44 therein. The trough 42 has an inner edge 46 and an outer edge 48. A plate 50 is secured to the inner edge 46. The plate 50 has two sets of perforations 52a and 52b which define a non-perforated strip 54. Although the strip 54 is preferred, the plate 50 can be non-perforated, fully perforated or have any uniform or non-uniform pattern of perforations. The size and spacing of the perforations, and the number and size of the non-perforated strips can vary depending upon the load the pre-wash zone is expected to handle. The plate is inclined to horizontal at an angle of between 2 to 20°.

Figure 4:
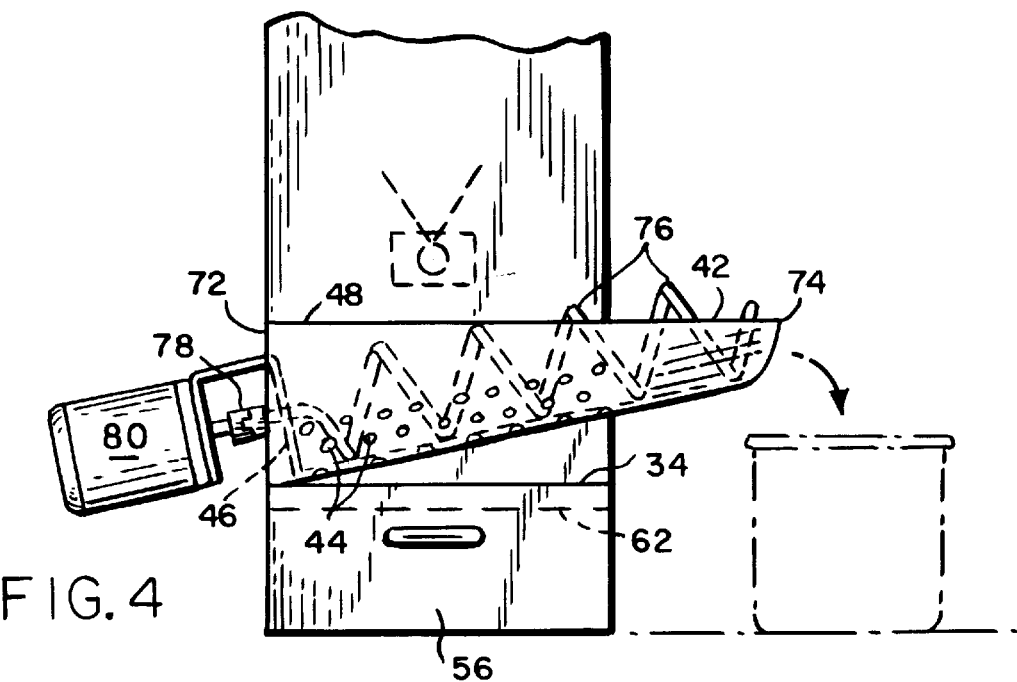
FIG. 4 is a bottom perspective view of the system.

Referring to FIG. 4, a sink 56 is formed by a wall 58 having an upper edge 60 (FIG. 2) which is joined to the outer edge 48 of the trough 42. The wall 58 continues under the trough 42 and terminates in a lip 62. Side walls 64 and 66 close the wall 58 to form the sink 56. The side walls 64 and 66 each have steps 68 and 70 respectively which are co-terminus with the lip 62.

Referring to FIGS. 2 and 3, the trough 42 comprises a closed lower end 72 and an open discharge end 74. A spiral drive (auger) 76 is received in the trough 42 for rotation therein. A drive shaft 78 is secured to a motor 80. The drive shaft passes through and is supported by the closed end (wall) 72.

When the system 40 is secured in the pre-wash zone 22, the edges of the plate 50 abut the inner surfaces of the walls 24, 26 and 28. The lower edge 36 of the wall 22 defines with the inner edge 46 of the trough 42 the opening 32. The lip 62 of the sink 56 is received inside the prewash zone 12 and the intersection of the floor 58 and lip 62 seats on the support edge 34.

Water and gross garbage from the pre-wash zone 12 flow across the floor 50 and into the trough 42. Water flows through the perforations 52 into the sump 38. If the gross garbage starts to mat on the perforations 52 the free flow of water on the strip 54 effects a sluicing action to inhibit the matting. The spiral drive 76 moves the garbage along the trough 42 to the discharge end 74 where it falls into a container 80. Water flows through the perforations 44 into the sink 56 and then flows into the sump 38.

The water is the pushing factor which moves the garbage out of the pre-wash section. The drained water is collected and directed back into the pre-wash sump 38 without the use of recirculating pumps and without the necessity of having screens emptied. The gross garbage is constantly and automatically removed from the warewashing machine with a minimum of labor and handling.

In the event that some garbage may not fall as freely from the trough as it should, the trough is totally exposed and visible. A scraping rake can be handily placed and used to clear the trough into the barrel. Since the barrel is quite visible, it can be replaced when it is full which is a significant improvement over the hidden screen baskets, which being out of sight, can become clogged without an operator knowing it until the machine overflows.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A system for removal of water and gross garbage from a section of a warewashing machine in which section the water and gross garbage are removed the section having one wall with an opening defined in part by a lower edge;

a plate adapted to be received in the section to receive and transfer the water and gross garbage to a perforated trough, the trough having an inside edge and an outside edge, the inside edge secured to plate whereby water and gross garbage flow across the plate into the trough;

a sink disposed below trough and in communication with a sump to return the water flowing through the perforations in the trough to the sump;

a spiral drive rotatably received within the trough;

means for powering the drive, the trough having a closed end and a discharge end, the discharge end of the trough extending beyond the sink whereby gross garbage flowing into the trough is moved by the drive from the closed end to the discharge end while the water flows through the perforations in the trough into the sink; and means for securing the system to the section.

2. The system of claim 1 wherein the trough is inclined upwardly with reference to horizontal from its closed end to its discharge end.

3. The system of claim 1 wherein the plate comprises a plurality of perforations whereby water can flow directly into the sump.

4. The system of claim 3 wherein the perforations comprise a first and second set of perforations which define a non-perforated section therebetween to inhibit the matting of garbage on the perforated sections.

* * * * *